United States Patent
Tamm et al.

(10) Patent No.: US 8,118,110 B2
(45) Date of Patent: Feb. 21, 2012

(54) AGRICULTURAL IMPLEMENTS WITH HINGED AND FLOATING WINGS

(75) Inventors: Christopher Lee Tamm, Brillion, WI (US); Norman George Reichardt, Reedsville, WI (US)

(73) Assignee: Landoll Corporation, Marysville, KS (US)

( * ) Notice: Subject to any disclaimer, the term of this patent is extended or adjusted under 35 U.S.C. 154(b) by 0 days.

(21) Appl. No.: 12/387,935

(22) Filed: May 8, 2009

(65) Prior Publication Data
US 2010/0282481 A1 Nov. 11, 2010

(51) Int. Cl.
*A01B 63/00* (2006.01)
(52) U.S. Cl. .................. 172/460; 172/310; 172/776
(58) Field of Classification Search ............ 172/310, 172/311, 452, 459, 460, 776
See application file for complete search history.

(56) References Cited

U.S. PATENT DOCUMENTS

| | | | |
|---|---|---|---|
| 93,959 A | 8/1869 | Brown et al. | |
| 492,255 A | 2/1893 | Ashurst | |
| 1,496,895 A | 6/1924 | Kurtz | |
| 1,938,132 A | 12/1933 | Broemmelsick et al. | |
| 2,580,100 A | 12/1951 | Johansen et al. | |
| 3,414,064 A | 12/1968 | Foster | |
| 4,030,551 A | 6/1977 | Boetto et al. | |
| 4,102,404 A * | 7/1978 | Krammer | 172/310 |
| 4,105,077 A | 8/1978 | Seifert, Jr. | |
| 4,178,009 A * | 12/1979 | Worick | 172/311 |
| 4,232,747 A * | 11/1980 | Pfenninger et al. | 172/311 |
| 4,271,711 A * | 6/1981 | Vavra | 74/96 |
| 4,324,296 A * | 4/1982 | Schenk et al. | 172/311 |
| 4,328,869 A | 5/1982 | Perelli | |
| 4,504,076 A | 3/1985 | Bedney | |
| 4,509,602 A * | 4/1985 | Russ | 172/311 |
| 4,534,416 A | 8/1985 | Johnson | |
| 4,619,330 A * | 10/1986 | Machnee | 172/311 |
| 4,721,167 A | 1/1988 | Salley et al. | |

(Continued)

FOREIGN PATENT DOCUMENTS
EP 0606834 7/1994

OTHER PUBLICATIONS

"Brillion Pulverizers" Sales Brochure, Brillion Farm Equipment (1990).

(Continued)

*Primary Examiner* — Robert Pezzuto
*Assistant Examiner* — Jamie L McGowan
(74) *Attorney, Agent, or Firm* — Law Office of Mark Brown, LLC; Mark Brown (57) ABSTRACT

A towable soil pulverizer having a longitudinal center section, and foldable wings mounted by hinges on opposite sides of the center section to fold upwardly or downwardly about substantially longitudinal hinge axes. The wings and center section have ground working rollers. Each hinge has a spaced ball joint and guide roller in roller slot. A wing float axis for each wing extends substantially perpendicular to the longitudinal hinge axis in a transverse direction, each wing also being pivotal about the float axis. The hinge design with the float axis prevents weight transfer between the center section and wing sections when the pulverizer operates over uneven soil, to provide uniform soil conditioning over the width of the pulverizer. The center section rollers are positioned ahead of (or behind or co-linear with) the wing rollers. Components of the ball joint and roller guide in slot are fixedly and non-rotationally attached to the center section.

5 Claims, 12 Drawing Sheets

U.S. PATENT DOCUMENTS

| | | | |
|---|---|---|---|
| 4,721,168 A | 1/1988 | Kinzenbaw | |
| 4,790,389 A * | 12/1988 | Adee et al. | 172/776 |
| 4,817,729 A | 4/1989 | McCormick | |
| 4,896,732 A * | 1/1990 | Stark | 172/311 |
| 4,923,017 A | 5/1990 | Meek et al. | |
| 5,921,325 A * | 7/1999 | Meek et al. | 172/311 |
| 5,953,894 A * | 9/1999 | Aron et al. | 56/367 |
| 6,068,062 A * | 5/2000 | Brueggen et al. | 172/311 |
| 6,119,788 A * | 9/2000 | Bernier | 172/311 |
| 6,206,105 B1 * | 3/2001 | Friesen | 172/311 |
| 6,325,155 B2 | 12/2001 | Friggstad | |
| 6,374,923 B1 | 4/2002 | Friggstad | |
| 6,761,228 B2 * | 7/2004 | Dobson et al. | 172/311 |
| 2007/0079976 A1 | 4/2007 | Jagow | |

OTHER PUBLICATIONS

"Brillion Pulvi-Mulchers" Sales Brochure, Brillion Farm Equipment (1989).

* cited by examiner

AGRICULTURAL IMPLEMENTS WITH HINGED AND FLOATING WINGS

FIELD OF THE INVENTION

The present invention relates to towable agricultural implements such as soil pulverizers which have a center section and foldable wing sections mounted on opposite sides of the center section. The wings are unfolded when working the ground and are folded when transporting the pulverizer between fields or elsewhere.

BACKGROUND OF THE INVENTION

Pulverizers are used by farmers during planting season to help prepare an ideal seedbed. Since yield is a direct result of germination, which is dependent on soil conditions at planting time, having an ideal seedbed is desired. Pulverizers break up clods and insure good seed to soil contact, reducing germination time. Since the seedbed is firmed and air pockets are eliminated, capillary action in the soil is also increased making more moisture available to the plant through its root.

As fields become larger and individual farms cover more acres, equipment has become larger to cover more land in less time. One way to cover more land is to make machinery wider, but with that comes the problem of transporting it from field to field. Wide machinery is typically folded allowing for transport on public roadways. Inherent to a folding piece of machinery is to have a hinge point, making the wing fairly rigid with the center section in that it cannot follow the contour of the field as drawbar heights vary.

Figure 1:
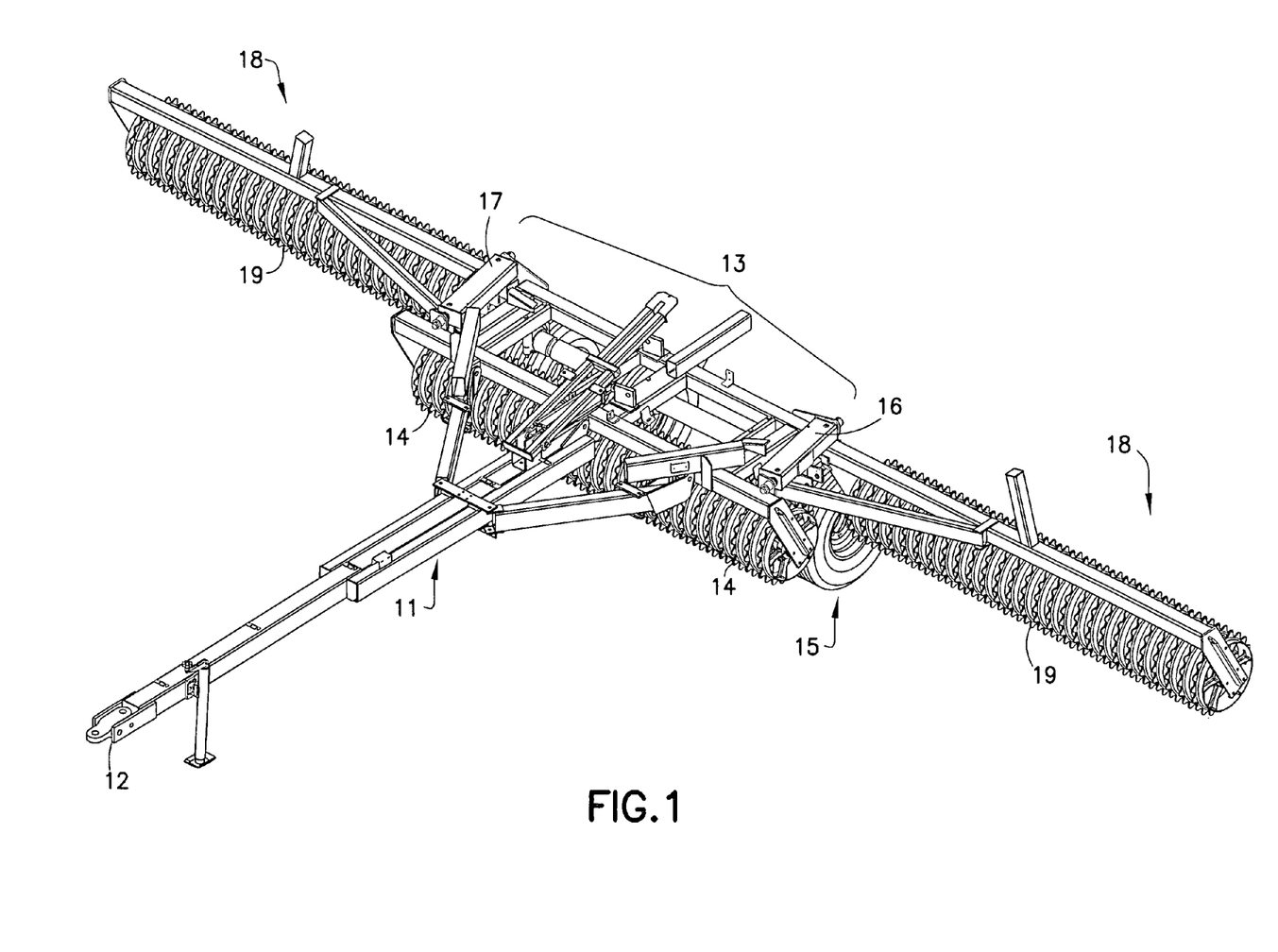
FIG. 1 is a perspective view of a conventionally hinged pulverizer with a center section and unfolded wing sections. Parts not essential to a discussion of the background and substance of the present invention are not shown.
Figure 6:
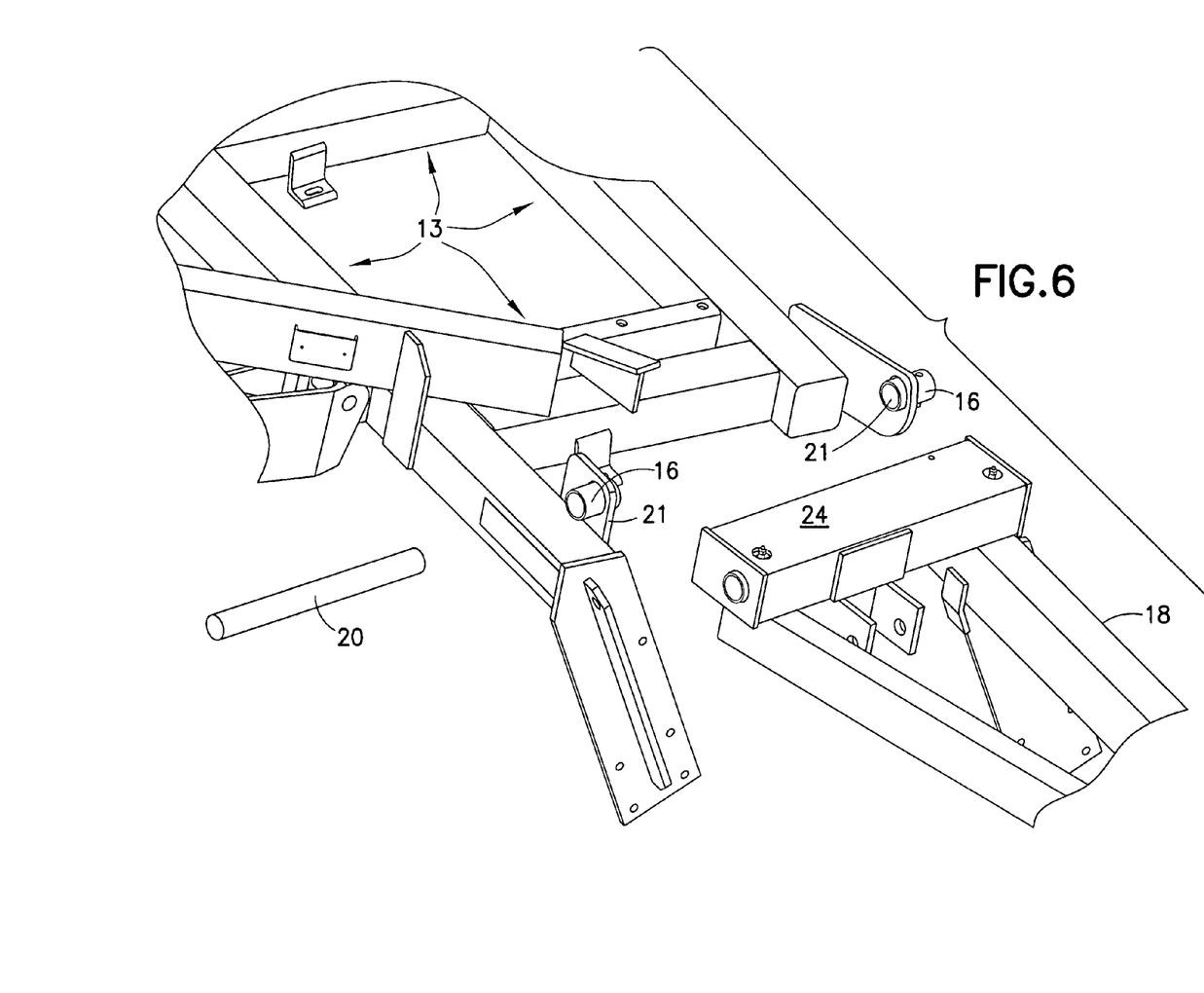
FIG. 6 is a perspective view of the conventional hinge components for the pulverizer of FIGS. 1-5.

FIG. 1, for example, shows a conventionally hinged pulverizer 10 having a drawbar 11 for attaching at one end 12 to a tractor (not shown) for towing the pulverizer. Drawbar 11 is attached at its other end to pulverizer center section 13. Center section 13 includes ground engaging roller wheels 14 constituting the center roller, transport wheels/rockshaft assembly 15, and hinge points 16, 17. Wing roller assemblies 18 with ground engaging roller wheels 19 extend transversely on opposite sides of center section 13 and are fairly rigidly connected to center section 13 at the hinge points 16, 17 respectively. When the pulverizer 10 is to be transported, wing assemblies 18 are folded about hinge points 16, 17 to a position shown, for example, in FIG. 2. A double acting hydraulic cylinder (not shown) on the center section acts to initiate and carry out the folding. Wing hinges 24 at hinge points 16, 17 connect the wing assemblies 18 to center section 13 of the pulverizer by conventional means of a hinge pin 20 and center section hinge plates and barrel 21, shown in FIG. 6 just prior to connection.

Figure 3:
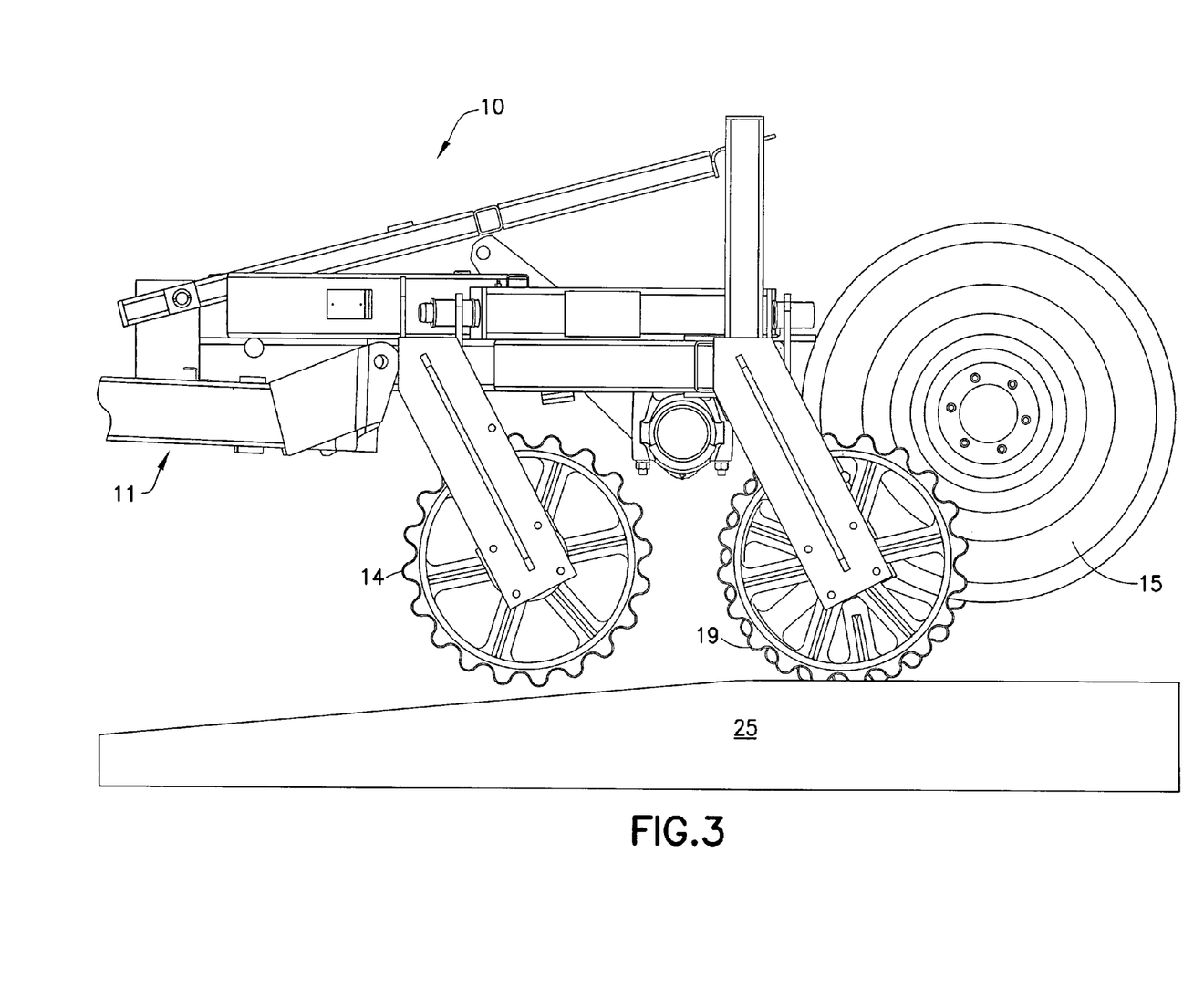
FIG. 3 is a left side elevation of the pulverizer of FIG. 1 showing a particular operating tendency with the conventional hinge and unfolded wings.
Figure 4:
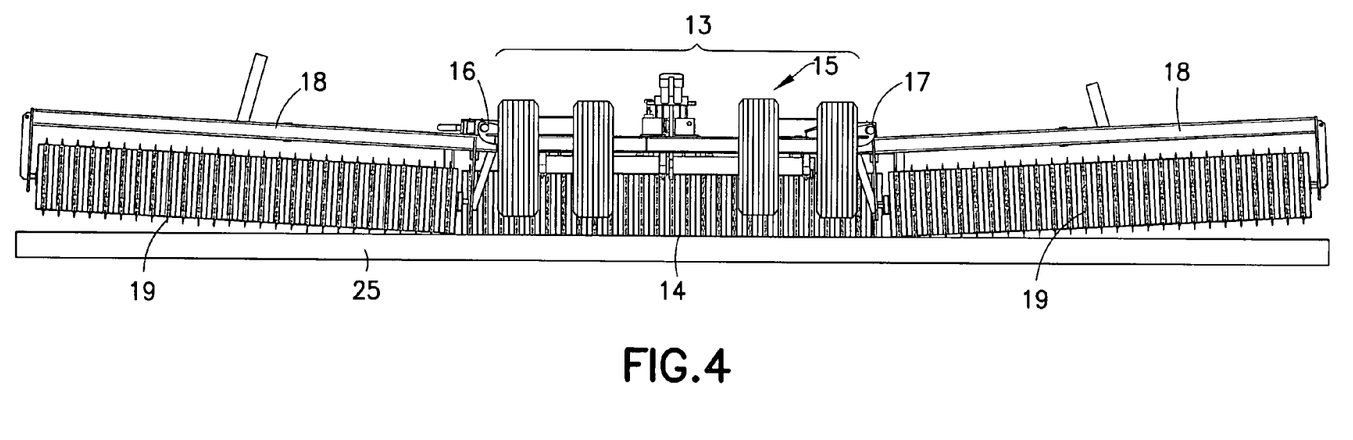
FIG. 4 is a rear view of the conventionally hinged pulverizer of FIG. 1 under the operating tendency of FIG. 3.
Figure 5:
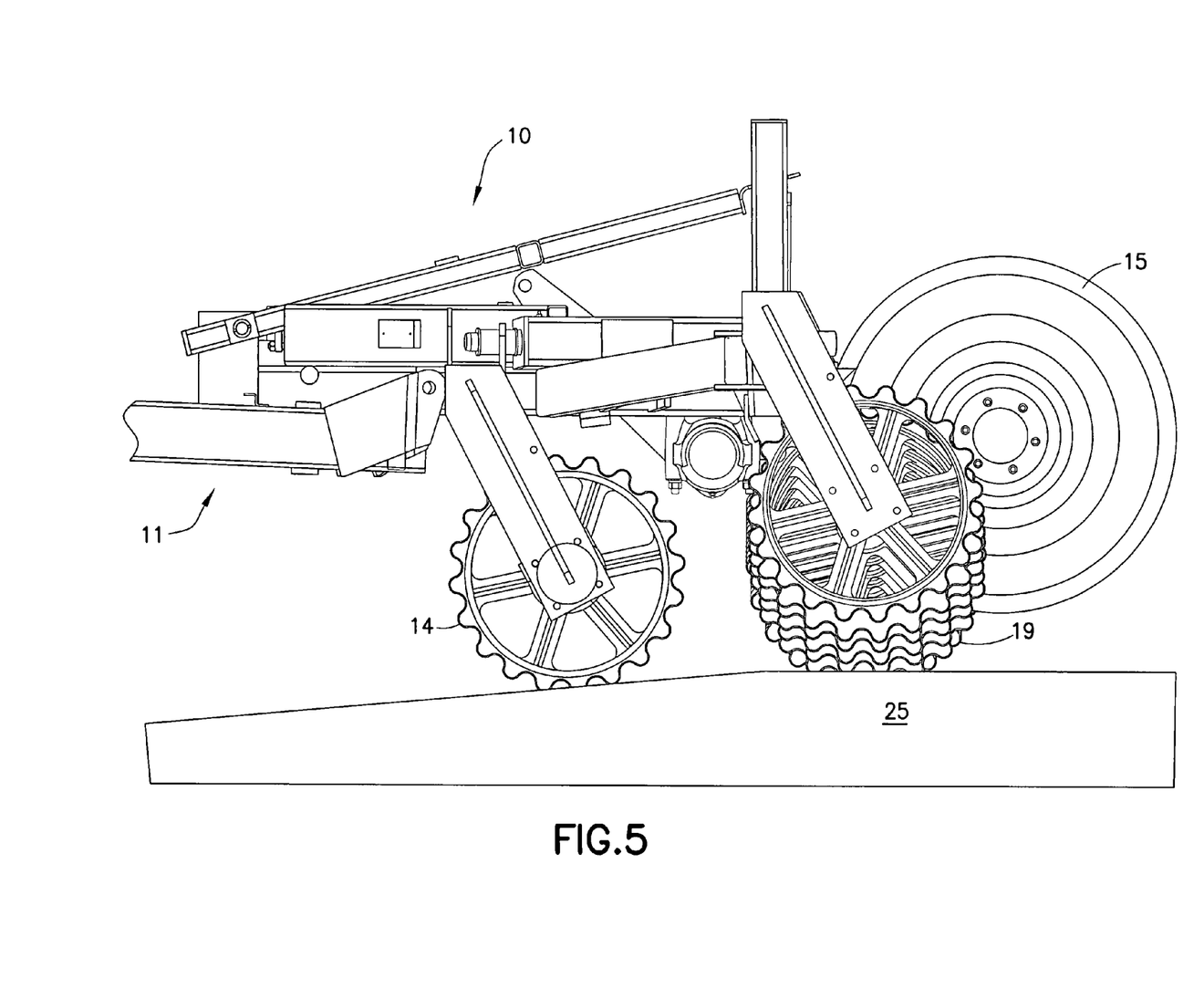
FIG. 5 is a left side elevation of the pulverizer of FIG. 1 showing the operating scenario that results from the FIGS. 3 and 4 operating tendencies.

As described above, the pulverizer, parts and hinge connections for the wings are all well known in the prior art. However, a difficulty with this design is that when the pulverizer is operational and towed over fields that are not perfectly level, the height of drawbar 11 varies and weight distribution on the ground engaging components is affected. In fact, both the said weight distribution and the depth control of the ground engaging components are both affected by varying drawbar heights (due to ground contours), ground contours at the rollers, and ground obstructions (stones) on the winged pulverizer. It is common in pulverizers for the wing rollers 19 to be set back from the center rollers 14 to provide some overlap, ensuring that over the total width of the pulverizer there are no strips of unconditioned soil. The varying drawbar heights come into consideration because the wing rollers are not in line with the center section rollers. More specifically, FIGS. 3-5 illustrate the effects of this design. In FIG. 3, the conventionally hinged pulverizer (shown from the left side) is being towed toward the left down from the top of a ground contour 25. Shown in exaggerated form, the weight of the center section is transferred to the wing rollers 19 and the center section rollers 14 tend to be lifted off the ground. In FIG. 4, a view towards the rear of the conventionally hinged machine of FIG. 3, the weight of the center section transferred to the wings causes them to lift at their outer extremities. Since the wings are allowed to flex about the hinge points, the wing rollers closest to the hinge now have to carry both the weight of the center section and the weight of the wings lifted off the ground, resulting in a poorly conditioned seed bed. As again viewed from the left side of the pulverizer, FIG. 5 shows what typically happens from the scenario of FIGS. 3 and 4. The center section is heavier than the wings due to the weight of the transport wheels/rockshaft assembly and the drawbar causing a reaction resulting in the wings picking up at the extremity to a point where the weight carried by the center section is balanced by the weight carried on the wings. Ground contact is limited on the wing rollers 19, the center section conditioning is limited due to the reduced weight on the center section rollers 14, and the wing roller portions nearest the hinge are forced to carry extra weight that may cause a packed groove in the soil.

In short, with the current conventionally hinged design, weight from the wings is transferred to the center section or vice versa. When this happens, portions of the wings or center section are not engaging the soil, making for inconsistent conditioning. Also, since weight transfer takes place, the rollers in contact with the soil have to carry extra weight, which gives the possibility of those rollers sinking into the ground and pushing the soil rather than rolling over the top of the soil, or packing the soil making it more difficult for germinating seeds and plants to break through. The conventional hinge design of FIG. 6 allows the wings to fold over the top of the center section, but does not allow any freedom for the wings to maintain uniform ground control as the drawbar height changes, causing the machine to rock about the center section rollers.

Attempts have been made in the past to deal with farm machines operating on uneven ground. See, for example, U.S. Pat. No. 93,959 (1869) involving the connection of two harrows operating side by side to form a double harrow. The side of a first harrow adjacent its longitudinal ends has two hoops, and the side of a second harrow adjacent its longitudinal ends has two arms to fit within the corresponding two hoops in the first harrow when the second harrow is positioned at a right angle to the first harrow. There is no center section between the two harrows which are positioned side by side, and no folding rotation between the two harrows. Each frame can move up and down or back and forth with respect to the other to a limited extent to provide a limited independent movement over uneven ground. There is no hinge or joint connection between the two frames. Each harrow frame has a separate chain draught connection for the protection and comfort of the towing horses. Among other deficiencies, the design of the '959 patent does not lend itself to solving the above-described difficulties of the conventionally hinged pulverizer having a drawbar, a center section with rollers, and the center section rollers positioned forward of folding-wing rollers.

Further, see for example U.S. Pat. No. 6,325,155 (2001) involving a design having a center frame and opposing double wings of inner and outer wing sections which are intended to follow ground elevation. A linkage allows the inner wings to move perpendicular to the center section, and there is a draft cable to help distribute the draft load generated by the outer wings. A universal joint having three axes of freedom connects the inner wing sections to the center section. A differential control rod parallel to the center section is required and which controls the universal-joint. An "L"-shaped linkage controls the movement of a pivot in a slot, the linkage being pivotally attached to the center frame and differential control bar. The center frame and universal joint are rotated ninety degrees in passing between the transport and field operational modes. The wings fold rearwardly into the transport mode. Altogether, this three-axis arrangement of parts and motions is overly complex for the needs satisfied by applicant's invention involving a considerably simpler structure and functioning.

SUMMARY OF THE INVENTION

The present invention is intended to avoid the above-discussed difficulties of conventionally hinged pulverizers. The proposed new design focuses on the hinge area of the winged implement and allows the wings to act independently of the center section as if the center section and opposing wing sections were three separate implements being towed but integrated into a single machine. All three sections can follow the contour of the soil surface and uniform conditioning of the soil can thus be obtained, contours or not. The new design utilizes a similar pulverizer center section and foldable wings on opposite sides of the center section. The wing rollers are placed rearwardly of the center section rollers, and a new simple hinge design is applied. The center section rollers may also be placed behind or co-linear with the wing rollers. Folding is not affected with the new design, and the wings are still folded upwardly and over the top by the well-known double acting hydraulic cylinder and associated components. However, another degree of limited freedom is added to the machine to apply a limited floating action to the wings.

Figure 2:
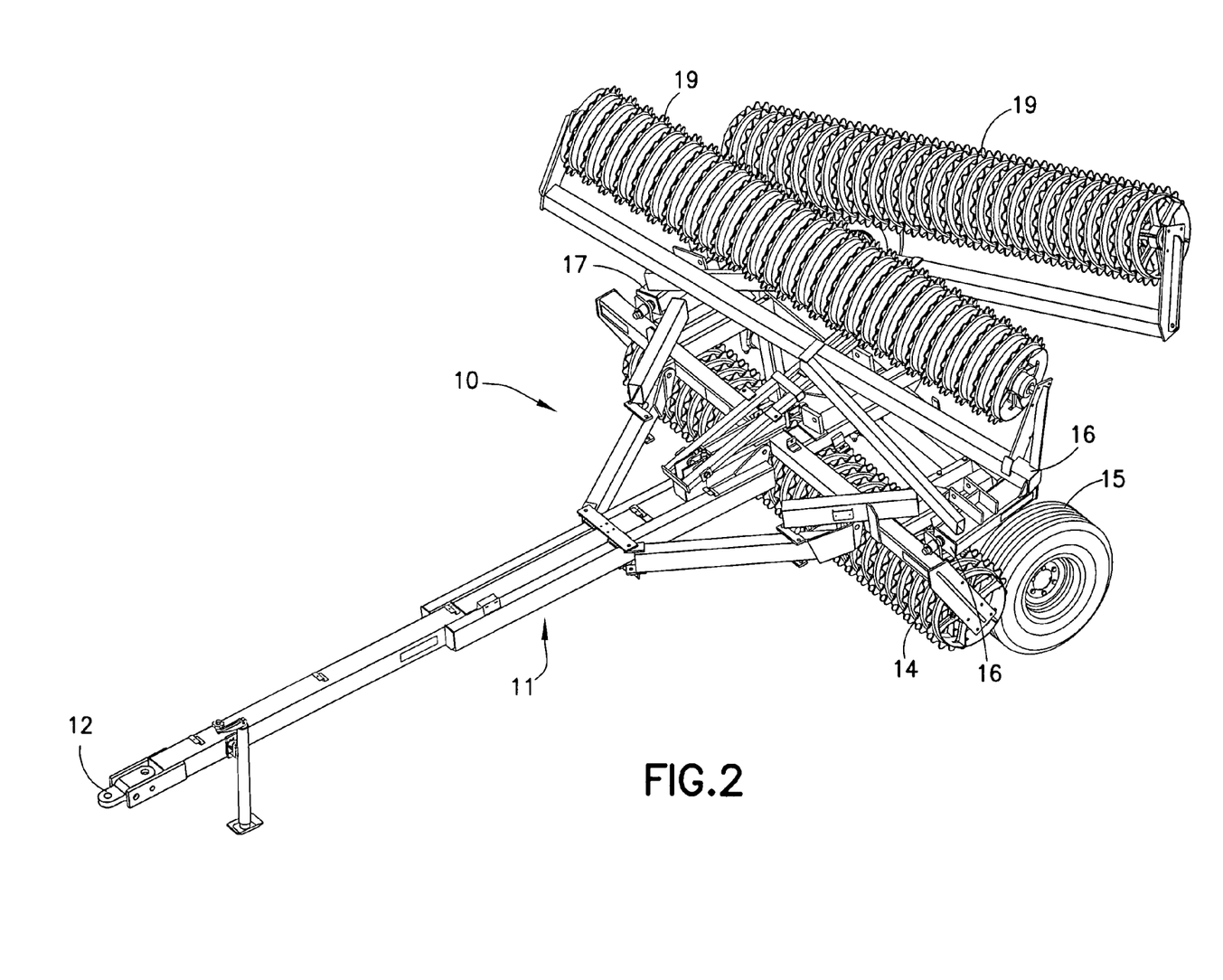
FIG. 2 is a perspective view of the conventionally hinged pulverizer of FIG. 1, but with the wings folded upward and over the center section for transport of the pulverizer.

More specifically, the hinge between each wing and the center section includes a ball joint adjacent one end of the hinge, and a guide roller in a roller slot adjacent the other end of the hinge. Certain components of the hinge, i.e., the ball of the ball joint and the roller slot, are non-rotationally and fixedly attached to the center section. The hinge axis extends substantially in a longitudinal direction from front to rear of the center section and passes through the ball joint and the guide roller The terms "longitudinal" and "longitudinal hinge axis" as used herein are intended to include a few degrees variation sideways from true longitudinal to allow folding of the wings without interfering with each other as shown in FIG. 2; as well as a few degrees up and down from true longitudinal as the guide roller moves up or down in the guide roller slot. The ball joint and the roller in the roller slot allow the wing to be folded up over the center section. Further, the ball joint and guide roller in roller slot allow a floating action of the wing about a further "float" axis perpendicular to the hinge axis to a degree determined by the depth of the roller slot. The hinge pin and hinge plates/barrels of the conventionally hinged pulverizer are eliminated. The floating action provided prevents the undesirable weight transfer from the wing sections to the center section and vice versa, through the designated range of floating provided by the new hinge design. The pulverizer thus is now able to conform to the contour of the soil to ensure that uniform conditioning takes place across the entire width of the machine. A further feature of the design is that if an obstacle such as a stone is encountered while in use, the section that rolls over the stone does not affect the rest of the machine since there is no weight transfer between sections.

It should also be noted that the new hinge design allows the pulverizer to be backed up in a field without the wings interfering when in the operating position.

Other features and advantages of the present invention will be apparent from the following description, drawings and claims.

DETAILED DESCRIPTION OF EMBODIMENT

Figure 7:
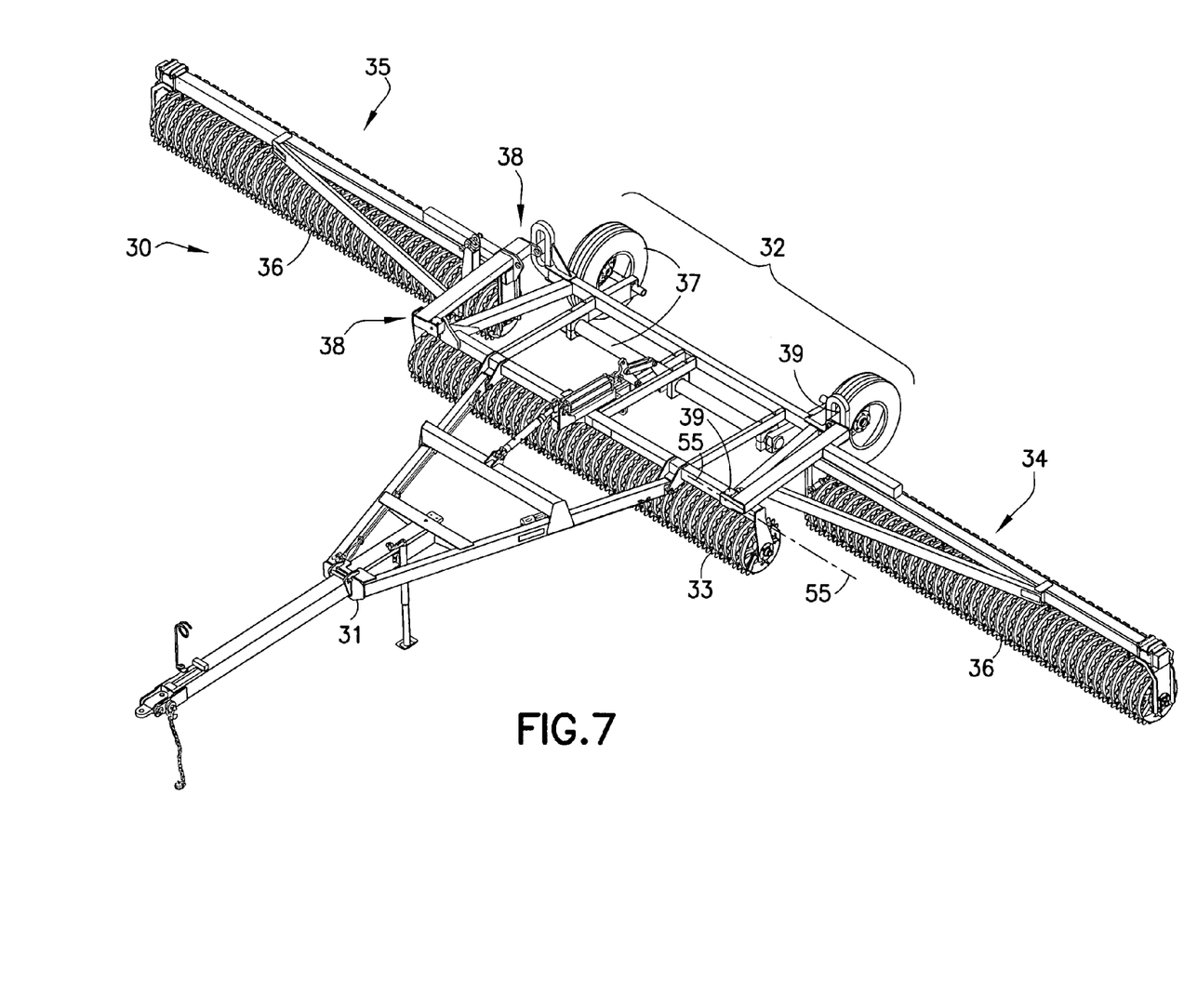
FIG. 7 is a perspective view corresponding to FIG. 1 of a pulverizer utilizing the present invention.
Figure 8:
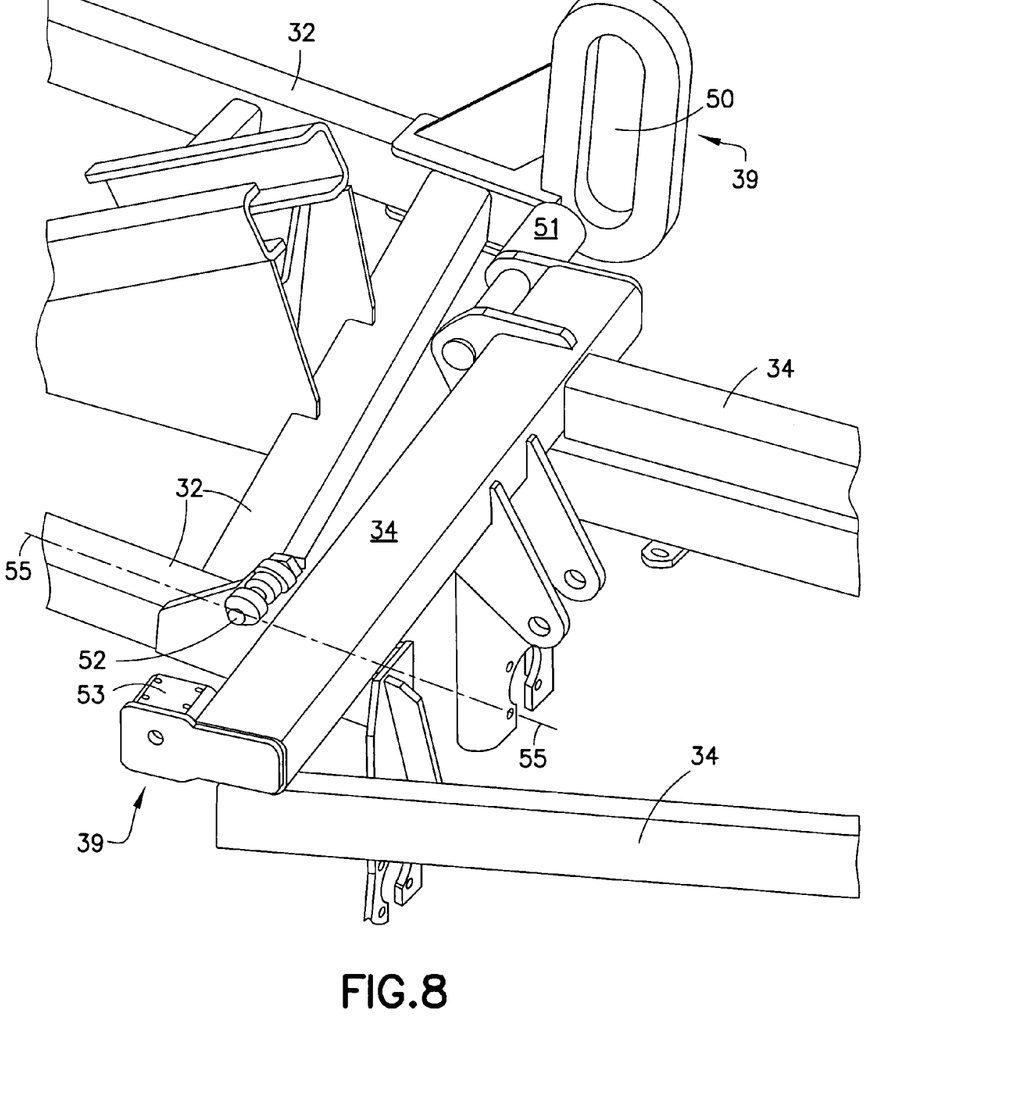
FIG. 8 is a perspective view of the new design of the components of the present invention to provide the desired hinged and floating wings.

Referring to FIG. 7, the pulverizer 30 is shown assembled with drawbar 31 for towing center section frame 32 having forwardly positioned center section rollers 33, wings 34 and 35 with wing rollers 36 and the wings being unfolded and extended on opposite sides of center section 32, the transport wheels and axle and rockshaft assembly 37, and the new hinge joints 38 and 39. FIG. 8 illustrates the enlarged and exploded hinge joint 39 positioned on the side of the center section as shown in FIG. 7, there being a corresponding hinge joint 38 present on the opposite side of center section 32 to connect wing 35. The following discussion, therefore, correspondingly applies to hinge joint 38 as well.

Referring to FIG. 8, new hinge joint 39 is comprised of roller slot 50 which is part of center section 32 at the outside rear of that section, guide roller 51 attached to wing 34 at its inner rear portion for mounting in roller slot 50 for up and down motion therein, ball joint ball 52 mounted on center section 32 at the outside front of that section, and ball joint socket 53 attached to the wing at its inner front portion for joining with ball 52 to form an assembled ball joint 60. The assembled ball joint, along with guide roller 51 inserted into roller slot 50, allows the wing 34 to fold up over center section 32 in the same manner as in FIG. 2, but here about a hinge "folding" axis defined by the assembled ball joint and guide roller 51.

In addition, by virtue of the combination of the ball joint and the guide roller-roller slot, wing 34 also can rotate about the ball joint to a limited degree (defined by the guide roller and roller slot) about a transverse axis through the assembled ball joint essentially perpendicular to the axis of folding. This allows the wing 34 to in effect "float" over obstacles, and this further axis is thus referred to as "float" axis 55-55. These two perpendicular axes allow two degrees of freedom for the wing to move in, and prevent weight transfer from the wings to the center section and vice versa as previously discussed as long as guide roller 51 is free to move in the ambit of roller slot 50 and is not forced against the top or bottom of the slot. The pulverizer is now able to conform to the contour of the soil, ensuring that uniform conditioning takes place along the entire width of the machine.

Figure 9:
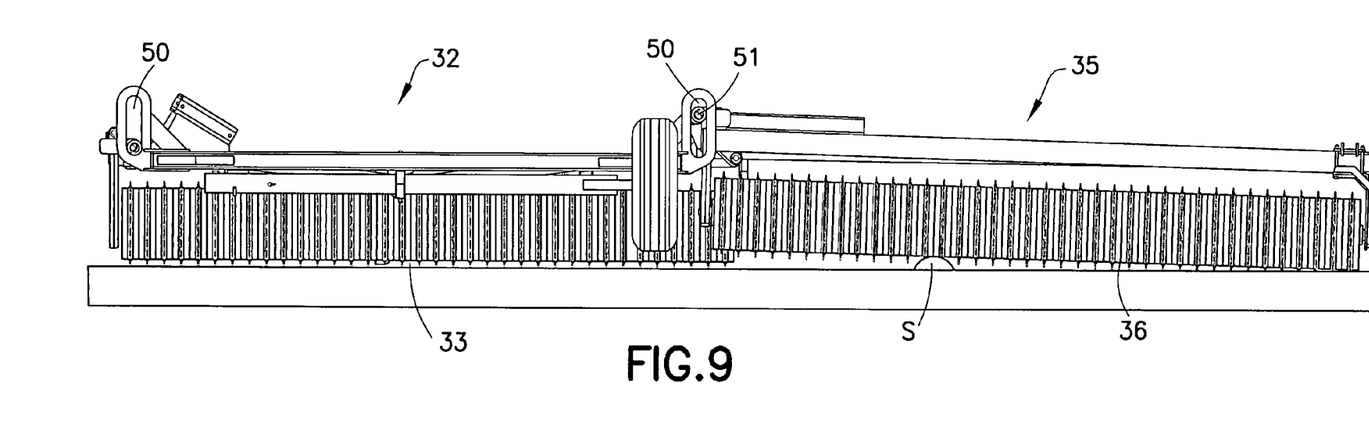
FIG. 9 is a rear view of the pulverizer of FIG. 7 (but showing only one wing) and illustrating a first wing floating operational scenario.
Figure 10:
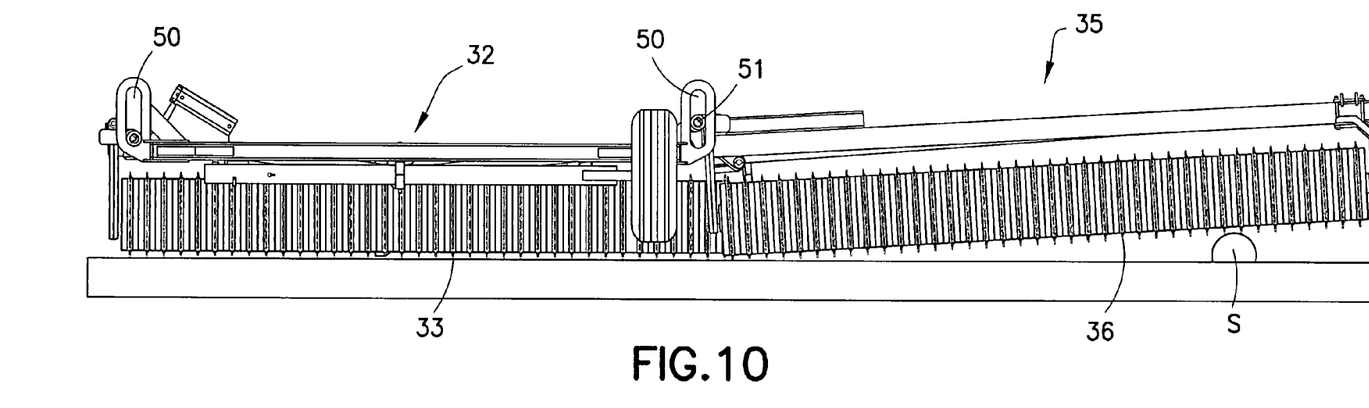
FIG. 10 is a rear view of the pulverizer of FIG. 7 (but showing only one wing) and illustrating a second wing floating operational scenario.

Another feature of the present invention is that if an obstacle such as a stone is encountered while in use, the section rolling over the stone does not affect the rest of the machine because of the lack of weight transfer between the sections. See, for example FIGS. 9 and 10, views from the rear of the pulverizer (left wing eliminated for ease of depiction). In each case the right wing is "floating" over an obstacle while in operation due to the ability of the guide roller to move in the roller slot and wing 35 thus able to pivot about the float axis 55-55 (FIGS. 7 and 8). In FIG. 9 the outer portion of the wing 35 is in contact with the soil surface due to the mass center of the wing being outboard of the stone S being passed over. In FIG. 10 the inner portion of the wing 35 is in contact with the soil surface due to the mass center of the wing being inboard of the stone S being passed over. In neither case is there weight transfer from the wing 35 to the center section 32 nor vice versa. In FIG. 9, the guide roller 51 has moved toward the top of roller slot 50; in FIG. 10, the guide roller 51 has moved toward the bottom of roller slot 50.

Figure 11:
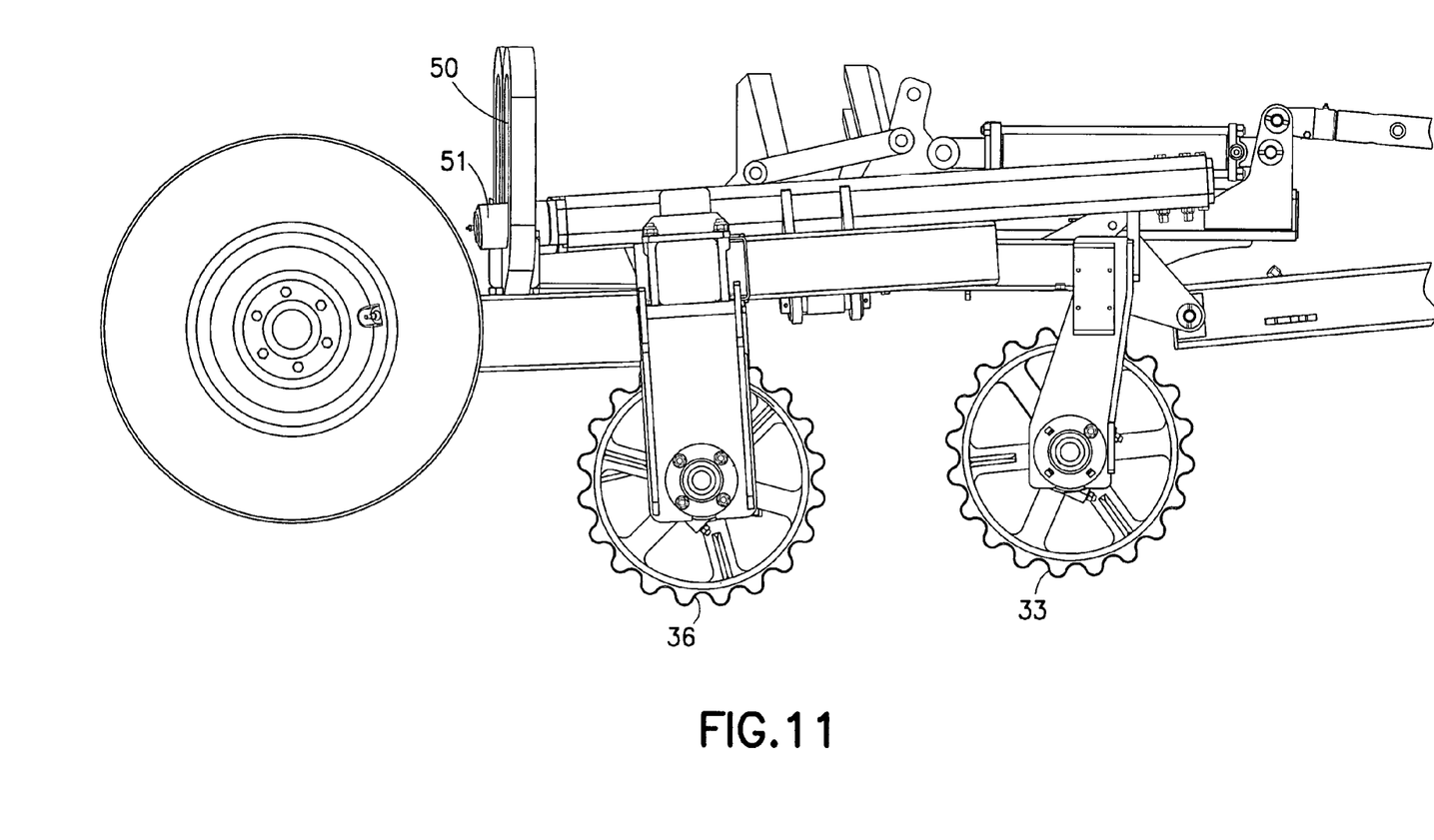
FIG. 11 is a right side elevation of the pulverizer of the present invention, in operational position and illustrating the guide roller at the bottom of the guide roller slot.
Figure 12:
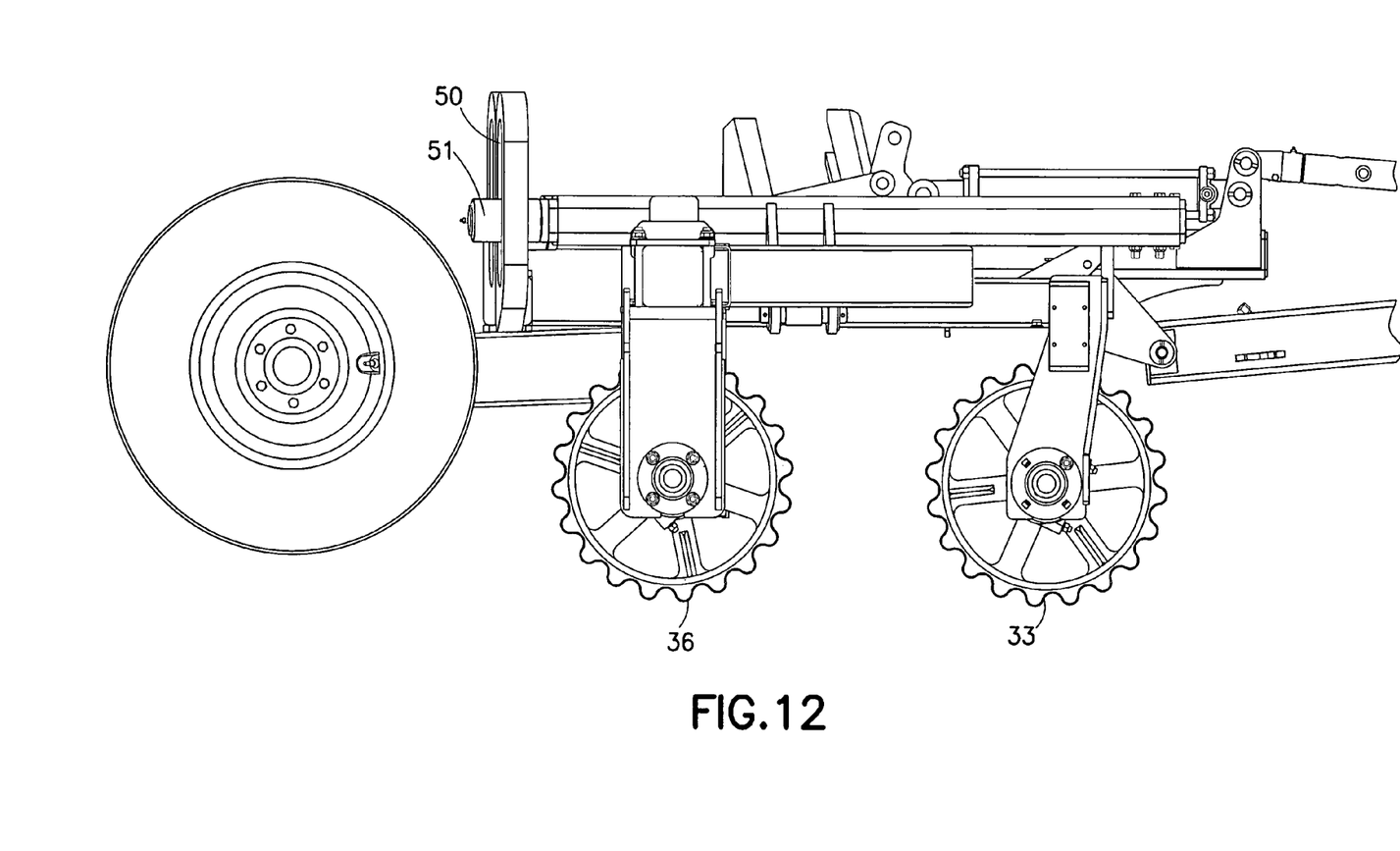
FIG. 12 is a right side elevation of the pulverizer of the present invention, in operational position and illustrating the guide roller several inches up from the bottom of the guide roller slot.
Figure 13:
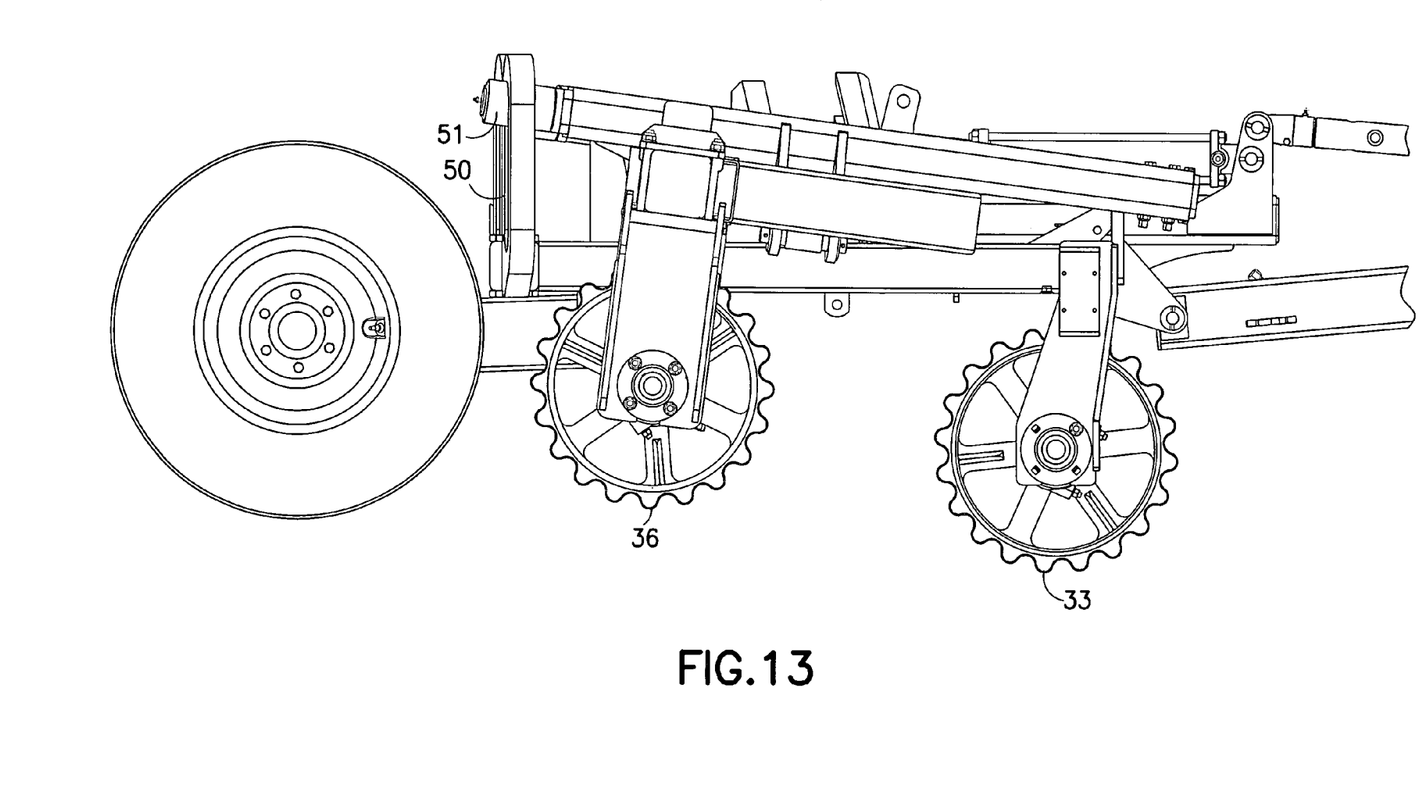
FIG. 13 is a right side elevation of the pulverizer of the present invention, in operational position and illustrating the guide roller raised to the top of the guide roller slot.

FIGS. 11-13 are right side elevational views of the pulverizer respectively showing guide roller 51 at the bottom of slot 50 (FIG. 11), guide roller 51 in the middle of slot 50 (FIG. 12) several inches from the slot bottom, and guide roller 51 at the top of slot 50 (FIG. 13) several further inches from the slot bottom. In FIGS. 11-13, the various elevations of the wing rollers 36 can be noted for the different operating conditions.

When the wings are to be folded upwardly for transport, the folding action may begin with the guide roller at the bottom of the guide slot. As a safety measure, a cam or other retaining means may then be used to move into position to hold the guide roller at the bottom of the slot during and after the folding to stabilize the wing until unfolded.

The present invention also may be used on agricultural implements other than a pulverizer that have a center section and foldable wing sections on opposite sides of the center section.

It will be appreciated by persons skilled in the art that variations and/or modifications may be made to the present invention without departing from the spirit and scope of the invention. For example, the ball joint may be mounted toward the rear (rather than the front) of the center section, and the guide roller in roller slot may be mounted towards the front (rather than rear) of the center section. Further, the ball of the ball joint may be mounted on the wing section (rather than the center section), and the socket of the ball joint may be mounted on the center section (rather than on the wing section). Additionally, the guide roller slot may be mounted on the wing section (rather than the center section) and the guide roller may be mounted on the center section (rather than the wing section). In these various permutations, the wing will still fold and unfold about a longitudinal hinge axis, and still float about an orthogonal float axis.

Still further, the ball joint could be replaced by an assembly of plates and tubes to act as part of the folding hinge and provide a float axis as well; and, the guide roller in guide slot could be replaced by a combination of rollers to achieve the limited ambit of travel of the wing about the orthogonal float axis. Such means, however, do involve more complexity and more parts.

The present embodiment is, therefore, to be considered as illustrative and not restrictive.

What is claimed is:

1. A towable agricultural implement for working the soil, comprising in combination a longitudinally extending center section including a center section frame with leading and trailing edges and foldable wings mounted on opposite sides of the center section, each wing having a wing frame with leading and trailing edges;

the foldable wings being hinged at their inner ends to opposite sides of the center section and pivotable about a longitudinal hinge axis to fold upwardly over the center section for transport or to unfold downwardly from the folded position for field operation; the center section and wings having ground-working elements; each wing being connected to the center section by a hinge having a ball joint located at said center section frame and wing frame leading edges and a guide roller located at said wing frame trailing edge and rotatable received in a vertical roller slot formed by a slotted retainer bracket extending from said center section frame or said wing frame at a respective center section or wing frame trailing edge; the ball joint having one of a ball and socket attached to the center section at a respective opposite side of the center section, and the other of the ball and socket attached to the wing at a respective wing inner end; the guide roller in roller slot having one of the guide roller and slotted retainer bracket attached to the center section, and the other of the guide roller and slotted retainer bracket attached to the wing; a wing float axis passing through the ball joint and extending perpendicular to the longitudinal hinge axis in a transverse direction, the wing being pivotal about the float axis and the extent of the pivoting being determined by the ambit of the floating motion of the roller in the roller slot; the hinge preventing substantial weight transfer between the center section and wing section when the implement operates over uneven soil and the guide roller in the roller slot is positioned between the ends of the slot; each said ball joint and said guide roller in roller slot hinge being positioned generally along a respective longitudinal hinge axis with said ball joint located in spaced relation in front of said guide roller in the roller slot; and each said guide roller in a respective roller slot restraining a respective wing against movement relative to said center section, except for limited rotation around said wing float axis.

2. The towable agricultural implement of claim 1, wherein the ball of the ball joint is mounted to and toward the front of the center section, the socket of the ball joint is mounted to the wing section, the guide roller slot is mounted to and toward the rear of the center section, and the guide roller is mounted to the wing section.

3. The agricultural implement of claim 1, wherein the wing float axis intersects the hinge axis.

4. The agricultural implement of claim 1, wherein the wing float axis is perpendicular to the hinge axis.

5. The agricultural implement of claim 1, which includes: each said ball joint being aligned with a respective longitudinal hinge axis with one of said ball and socket being located behind the other of said ball and socket.

* * * * *